US010928878B2

(12) United States Patent
Morales et al.

(10) Patent No.: US 10,928,878 B2
(45) Date of Patent: Feb. 23, 2021

(54) RESERVE POWER SYSTEM FOR DATA CENTER

(71) Applicant: Amazon Technologies, Inc., Seattle, WA (US)

(72) Inventors: Osvaldo P. Morales, Seattle, WA (US); James R. Hamilton, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 121 days.

(21) Appl. No.: 16/042,934

(22) Filed: Jul. 23, 2018

(65) Prior Publication Data

US 2018/0329470 A1 Nov. 15, 2018

Related U.S. Application Data

(63) Continuation of application No. 14/221,069, filed on Mar. 20, 2014, now Pat. No. 10,031,570, which is a continuation of application No. 12/825,198, filed on Jun. 28, 2010, now Pat. No. 9,793,752.

(51) Int. Cl.
*G06F 1/30* (2006.01)
*H02J 9/04* (2006.01)
*H02J 9/06* (2006.01)
*H02J 9/02* (2006.01)

(52) U.S. Cl.
CPC .................. *G06F 1/30* (2013.01); *H02J 9/02* (2013.01); *H02J 9/04* (2013.01); *H02J 9/06* (2013.01); *H02J 9/061* (2013.01)

(58) Field of Classification Search
CPC ........ H02J 9/04; H02J 9/06; H02J 9/02; H02J 9/061; G06F 1/30

USPC .................................................... 307/64–66
See application file for complete search history.

(56) References Cited

U.S. PATENT DOCUMENTS

| | | |
|---|---|---|
| 4,060,735 A | 11/1977 | Pascucci et al. |
| 5,583,440 A | 12/1996 | Bisher |
| 5,675,194 A | 10/1997 | Domigan |
| 5,745,356 A | 4/1998 | Tassitino, Jr. et al. |
| 5,770,897 A | 6/1998 | Bapat et al. |
| 6,191,500 B1 | 2/2001 | Toy |
| 6,304,006 B1 | 10/2001 | Jungreis |
| 6,433,444 B1 | 8/2002 | de Vries |
| 6,992,247 B2 | 1/2006 | Rasmussen et al. |
| 7,197,888 B2 | 4/2007 | LeClear et al. |
| 7,265,458 B2 | 9/2007 | Edelen et al. |

(Continued)

OTHER PUBLICATIONS

U.S. Appl. No. 14/133,525, filed Dec. 18, 2013, Paul Andrew Churnock.

(Continued)

*Primary Examiner* — Carlos Amaya
(74) *Attorney, Agent, or Firm* — Robert C. Kowert; Kowert, Hood, Munyon, Rankin & Goetzel, P.C.

(57) ABSTRACT

A system for performing computing operations in a data center includes one or more sets of computer systems, one or more primary power systems, and a reserve power system. The primary power systems include at least one power distribution unit that supplies power to at least one of the sets of computer systems. The reserve power system automatically supplies power to at least one of the sets of computer systems if a condition is met (such as a failure of the primary power system).

20 Claims, 8 Drawing Sheets

(56) References Cited

U.S. PATENT DOCUMENTS

| | | | |
|---|---|---|---|
| 7,296,172 B2 * | 11/2007 | Hsu | G06F 1/30 |
| | | | 713/330 |
| 7,459,803 B2 | 12/2008 | Mosman | |
| 7,472,290 B2 | 12/2008 | Diab et al. | |
| 7,478,251 B1 | 1/2009 | Diab et al. | |
| 7,514,815 B2 | 4/2009 | Paik et al. | |
| 7,521,884 B2 | 4/2009 | Filippenko | |
| 7,560,831 B2 | 7/2009 | Whitted et al. | |
| 7,565,555 B2 | 7/2009 | Diab | |
| 7,566,988 B2 | 7/2009 | Heber et al. | |
| 7,616,432 B2 | 11/2009 | Luebke et al. | |
| 7,642,676 B2 | 1/2010 | Washington | |
| 7,661,459 B2 | 2/2010 | Wesley et al. | |
| 7,888,816 B2 | 2/2011 | Zajkowski | |
| 7,939,968 B2 | 5/2011 | Hjort et al. | |
| 7,982,338 B2 | 7/2011 | O'Leary | |
| 7,991,588 B1 | 8/2011 | Krieger | |
| 8,108,699 B2 | 1/2012 | Diab | |
| 8,173,898 B2 | 5/2012 | Rasmussen et al. | |
| 8,212,401 B2 | 7/2012 | Linkhart et al. | |
| 8,212,427 B2 | 7/2012 | Spitaels et al. | |
| 8,222,548 B2 | 7/2012 | Espeut, Jr. | |
| 8,251,785 B2 | 8/2012 | Schmitt et al. | |
| 8,294,297 B2 | 10/2012 | Linkhart et al. | |
| 8,447,569 B1 | 5/2013 | Marwah et al. | |
| 2004/0201282 A1 | 10/2004 | Kado et al. | |
| 2005/0200205 A1 | 9/2005 | Winn et al. | |
| 2007/0046103 A1 | 3/2007 | Belady et al. | |
| 2007/0118772 A1 | 5/2007 | Diab | |
| 2008/0116898 A1 | 5/2008 | Washington | |
| 2008/0120187 A1 | 5/2008 | Wesley et al. | |
| 2008/0303347 A1 | 12/2008 | Zajkowski | |
| 2009/0009001 A1 | 1/2009 | Marwali et al. | |
| 2009/0033153 A1 | 2/2009 | Linkhart et al. | |
| 2009/0314541 A1 | 12/2009 | Jones et al. | |
| 2009/0314889 A1 | 12/2009 | Baatz et al. | |
| 2010/0019574 A1 * | 1/2010 | Baldassarre | H02J 3/14 |
| | | | 307/23 |
| 2010/0141039 A1 * | 6/2010 | Belady | G06F 1/30 |
| | | | 307/68 |
| 2010/0235671 A9 | 9/2010 | Jain | |
| 2011/0049980 A1 | 3/2011 | Paik et al. | |
| 2011/0187197 A1 | 8/2011 | Moth | |
| 2011/0260538 A1 | 10/2011 | Huang | |
| 2012/0000975 A1 | 1/2012 | Heath et al. | |
| 2012/0068541 A1 | 3/2012 | Anderson | |
| 2012/0109553 A1 | 5/2012 | Hancock et al. | |
| 2012/0181869 A1 | 7/2012 | Chapel et al. | |
| 2012/0331477 A1 | 12/2012 | Zeighami et al. | |

OTHER PUBLICATIONS

U.S. Appl. No. 12/825,198, filed Jun. 28, 2010, Osvaldo P. Morales.
U.S. Appl. No. 15/882,944, filed Jan. 29, 2018, Paul Andrew Chumock et al.

* cited by examiner

RESERVE POWER SYSTEM FOR DATA CENTER

CONTINUING APPLICATION INFORMATION

This application is a Continuation of U.S. application Ser. No. 14/221,069, filed, Mar. 20, 2014, now U.S. Pat. No. 10,031,570, which is a continuation of U.S. application Ser. No. 12/825,198, filed Jun. 28, 2010, now U.S. Pat. No. 9,793,752, which are incorporated by reference herein in their entirety.

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carried out an organization's operations. Typically, a computer room of a computing facility includes many server racks. Each server rack, in turn, includes many servers and associated computer equipment.

Because the computer room of a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage (e.g., 110V). A network of cabling, bus bars, power connectors, and power distribution units, is used to deliver the power at the lower voltage to numerous specific components in the facility.

Some data centers have no redundancy at the PDU level. Such data centers may have a large affected zone when a UPS or PDU failure in the power system occurs. In addition, some data centers have "single threaded" distribution via the electrical supply to the floor, and in which maintenance can only be performed when the components are shut-off.

Some data centers include back-up components and systems to provide back-up power to servers in the event of a failure of components or systems in a primary power system. In some data centers, each primary power system may have its own back-up system that is fully redundant at all levels of the power system. For example, in a data center having multiple server rooms, each server room may have its own primary power system and back-up power system. The back-up system for each server room may have a switchboard, uninterruptible power supply (UPS), and floor power distribution unit (PDU) that mirrors a corresponding switchboard, uninterruptible power supply, and floor power distribution unit in the primary power system for that server room. Providing full redundancy of the primary power systems may, however, be very cost both in terms of capital costs (in that in may require a large number of expensive switchboard, UPSs, and PDUs, for example) and in terms of costs of operation and maintenance. In addition, with respect to the primary computer systems, special procedures may be required to switch components from the primary system to a back-up system, further increasing maintenance costs.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a reserve power system for computer systems in a data center are disclosed. According to one embodiment, a system for performing computing operations in a data center includes two or more sets of computer systems, one or more primary power systems, and a reserve power system. Each set of computer systems may correspond, for example, to a rack in the data center. In certain embodiments, the reserve power system is "oversubscribed" such that the total power requirements of computer systems coupled to the reserve power system exceed the capacity of the reserve power system to supply power at any given time. Thus, the reserve power system may not be fully redundant to the primary power system. The reserve power system can automatically switch one or more of the sets of computer systems from primary power to reserve power independently of other sets of computer systems such that only some of the sets of computer systems are on reserve power while others of the sets of the computer systems remain on primary power.

According to one embodiment, a system for providing reserve power to computer systems in a data center including a reserve power system. The reserve power system automatically supplies power to at least two sets of computer systems if a condition is met (such as a failure of a primary power system. The reserve power system includes two or more automatic transfer switches. Each of the automatic transfer switches may provide automatic switching to reserve power for a different set of computer systems According to one embodiment, a method of supplying reserve power to computer systems in a data center includes coupling a reserve power system to two or more sets of computer systems. The computer systems receive power from a primary power system. In certain embodiments, the reserve power system is "oversubscribed" in that the total power requirements of computer systems coupled to the reserve power system exceed the capacity of the reserve power system. One or more of the sets of computer systems can be automatically switched from primary power to reserve power (for example, upon failure of primary power to the sets of computer systems), while primary power is maintained to other of the sets of computer systems.

In various embodiments, redundant power is provided for many different power distribution systems. In one embodiment, power redundancy is sized such that a system can support any N distribution system failures. In some embodiments, a reserve power system is oversubscribed to achieve N+1 redundancy for a data center (rather than, for example, 2N power redundancy). In some embodiments, a system having less than one-to-one redundancy may include overload protection, such as a breaker system, to protect against overload of a reserve power system.

In some embodiments, a reserve power system provides back up power for systems and components from top to bottom in a power distribution chain. In certain embodiments, a reserve power system backs up a primary power system including a transformer that receives power from a utility feed, a backup generator for the utility feed, a switchboard that receives power from the transformer, one or more UPSs that receive power from the switchboard, and one or more power distribution units.

As used herein, "computer room" means a room of a building in which computer systems, such as rack-mounted servers, are operated.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, "operating power" means power that can be used by one or more computer system components. Operating power may be stepped down in a power distribution unit or in elements downstream from the power distribution units. For example, a server power supply may step down operating power voltages (and rectify alternating current to direct current).

As used herein, "wye transformer" or "Y transformer" refers to a transformer whose secondary windings are in a wye, or Y, configuration.

As used herein, "delta transformer" refers to a transformer whose secondary windings are in a delta configuration.

As used herein, "power distribution unit" means any device, module, component, or combination thereof, that can be used to distribute electrical power. The elements of a power distribution unit may be embodied within a single component or assembly (such as a transformer and a rack power distribution unit housed in a common enclosure), or may be distributed among two or more components or assemblies (such as a transformer and a rack power distribution unit each housed in separate enclosure, and associated cables, etc.). A power distribution unit may include a transformer, power monitoring, fault detection, isolation.

As used herein, "primary power" means any power that can be supplied to an electrical load, for example, during normal operating conditions.

As used herein, "floor power distribution unit" refers to a power distribution unit that can distribute electrical power to various components in a computer room. In certain embodiments, a power distribution unit includes a k-rated transformer. A power distribution unit may be housed in an enclosure, such as a cabinet.

As used herein, "rack power distribution unit" refers to a power distribution unit that can be used to distribute electrical power to various components in a rack. A rack power distribution may include various components and elements, including wiring, bus bars, connectors, and circuit breakers.

As used herein, "remote power panel" means any panel, device, module, component, or combination thereof, that can be used to transfer or distribute electrical power from one or more input conductors to one or more output conductors. In certain embodiments, a remote power panel includes main lug only panel conductors. A remote power panel may be housed in an enclosure, such as a cabinet.

As used herein, "reserve power" means power that can be supplied to an electrical load upon the failure of, or as a substitute for, primary power to the load.

As used herein, "source power" includes power from any source, including but not limited to power received from a utility feed. In certain embodiments, "source power" may be received from the output of another transformer (which is sometimes referred to herein as "intermediate power").

As used herein, "computer system" includes any of various computer systems or components thereof. One example of a computer system is a rack-mounted server. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In the various embodiments, memory may include, but is not limited to, a computer-readable medium, such as a random access memory (RAM). Alternatively, a compact disc—read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

Figure 1:
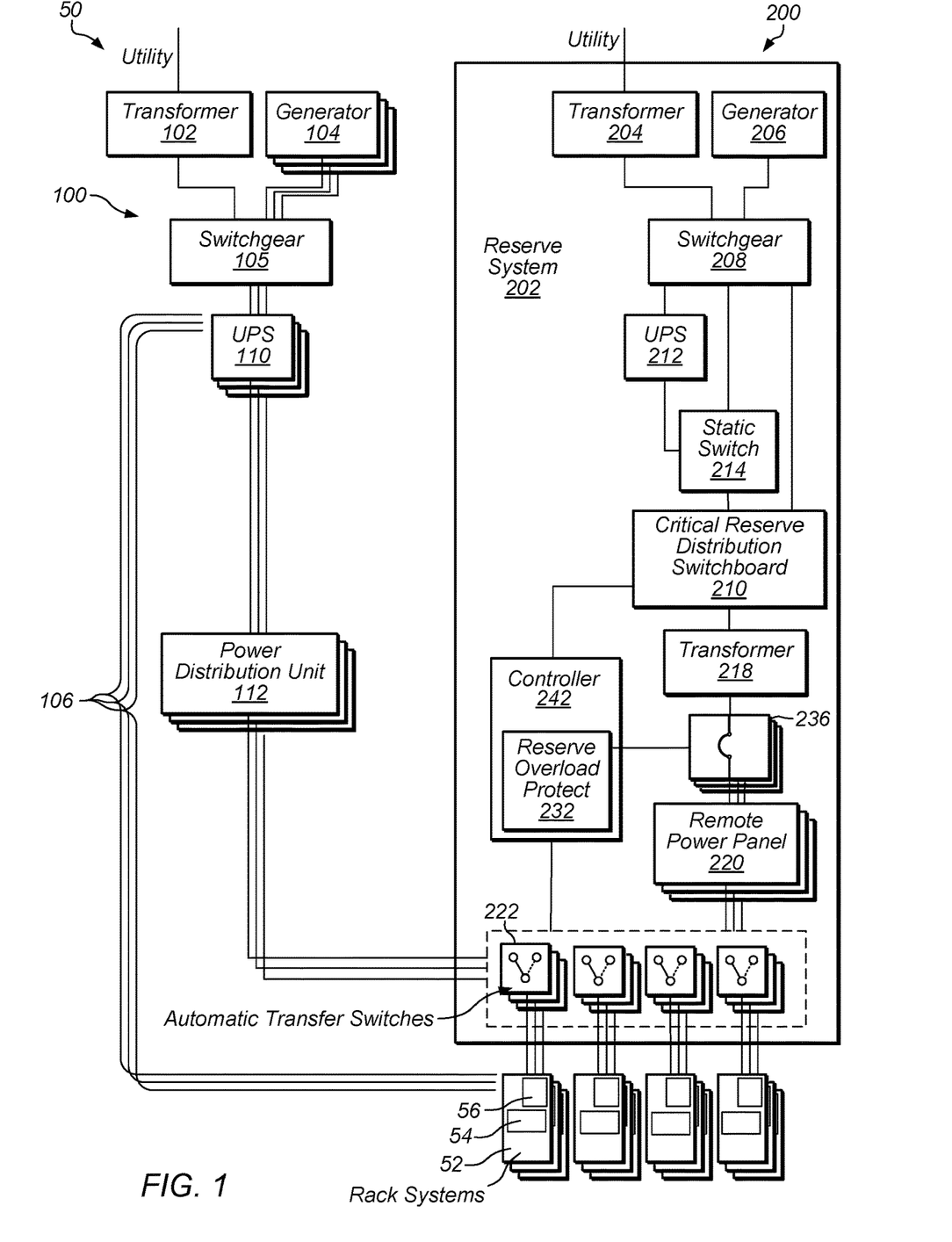
FIG. 1 is a block diagram illustrating one embodiment of a data center having a reserve power system that backs up primary power systems for multiple rooms of a data center.

FIG. 1 is a block diagram illustrating one embodiment of a data center having a reserve power system that backs up primary power systems for multiple rooms of a data center. Data center 50 includes rack 52, primary power side 100, and reserve power side 200. Primary power side 100 includes transformer 102, generators 104, and switchgear 105, and primary power systems 106. Sets of computer systems 54 in racks 52 may perform computing operations in data center 50. Computer systems 54 may be, for example, servers in a server room of data center 50. Computer systems 54 in racks 52 may each receive power from one of primary power systems 106. In one embodiment, each of primary power systems 106 corresponds to, and provides power to, the servers in one room in data center 50. In one embodiment, each of primary power systems 106 corresponds to, and provides power to, one rack system in data center 102.

Primary power systems 106 each include UPS 110 and floor power distribution unit 112. Floor power distribution unit 112 provides power to various racks 52. In some embodiments, floor power distribution unit 112 includes a transformer that transforms the voltage from switchgear 105. Each of rack 52 may include a rack power distribution unit 56. Rack power distribution units 56 may distribute power to computer systems 54.

Transformer 102 is coupled to a utility feed. The utility feed may be a medium voltage feed. In certain embodiments, the utility feed is at a voltage of about 13.5 kilovolts or 12.8 kilovolts at a frequency of about 60 Hz. Generators 104 may provide power to primary power systems 106 in the event of a failure of utility power to transformer 102. In one embodiment, one of generators 104 provides back-up power for each of primary power systems 106. UPS 110 may provide uninterrupted power to racks 52 in the event of a power failure upstream from UPS 110.

Reserve power system 200 may provide reserve power for all of the computer systems 54 supplied by primary power systems 106. In some embodiments, reserve power system 200 is powered up at all times during operation of data center 50. Reserve power system 200 may be passive until a failure of one or more components of primary power side 100, at which time reserve power system 200 may become active.

For illustrative purposes, three primary power systems are shown in FIG. 1 (for clarity, details of only the front primary power system 106 are shown). The number of primary power systems 106 on primary power side 100 may vary, however. In certain embodiments, a primary power side may include only one primary power system. In addition, the number of power distribution units, UPSs, switchgear apparatus may vary from embodiment to embodiment (and, within a given embodiment, from system to system). In some embodiments, primary power system 106 includes many floor power distribution units 112. As another example, a primary power system may have one UPS that can supply power to many floor power distribution units.

Reserve power system 202 includes transformer 204 and generator 206. Transformer 204 may supply power to switchgear 208. Critical reserve distribution board 210 may receive power from switchgear 208. Power from switchgear 208 may pass through UPS 212. Static switch 214 is provided between UPS 212 and critical reserve distribution switchboard 210. Static switch 214 may provide for bypass of UPS 212 (for example, during maintenance of UPS 212).

Reserve power system 202 also includes transformer 218 and remote power panel 220. Transformer 218 may transform power from critical reserve distribution switchboard 208 and supply power to remote power panels 220. Remote power panels 220 may distribute power to servers 54 in racks 52. In one embodiment, each of remote power panels 220 of reserve power system 202 corresponds to one of floor power distribution units 112 of one of primary power systems 112. For example, if a floor power distribution unit distributes primary power to all of the computer systems in a rack, a remote power panel may distribute reserve power to all of the computer systems in that rack.

Reserve power system 202 also includes an array of automatic transfer switches 222. Automatic transfer switches 222 may control switching of power to computer systems 54 between primary power side 100 and reserve power side 200. automatically switch power from one of primary power systems 106 to reserve power system 202. In some embodiments, one automatic transfer switch is provided for each rack system in a computer room. Thus, an automatic transfer switch may switch input power to the rack between one of floor distribution units 112 and one of remote power panels 220. In another embodiment, an automatic transfer switch provided for each half of a rack system. In still another embodiment, automatic transfer switches may be provided at the server level. In certain embodiments, a reserve power system includes manual transfer switches. Manual transfer switches may be used, for example, to enable maintenance operations to be performed.

Although in the embodiment shown in FIG. 1, power to servers is switched between primary power and reserve power, in some embodiments, a data center may not have automatic transfer switches to switch between primary power and reserve power. In some embodiments, for example, servers in a rack system (such as servers 54 in racks 52) may be dual-supplied by two power systems or include power supplies that accept two our more power source inputs. A server may sourced from two power feeds without an automatic transfer switch. In some embodiments, a redundant power system for servers in a data center may operate in an active-active failover configuration. In other embodiments, a redundant power system for servers in a data center may operate in an active-passive failover configuration.

Reserve power system 202 further includes controller 230. Controller 230 may serve various control functions in reserve power system 202. In some embodiments, controller 230 may control some or all of automatic transfer switches 222 in reserve power system 202. Controller 230 includes reserve overload protect circuit 232. In certain embodiments, controller 230 includes at least one programmable logic controller. The programmable logic controller may control some or all of the switching in or among devices in reserve power system 202.

Shunt trips 236 are provided for each remote power panel 238. Shunt trips 236 may provide overload protection for reserve power system 202. For example, if automatic transfer switches 222 switch too much of the load from computer systems 54 to reserve power system 202, some of shunt trips 236 may shed their respective remote power panels 220 (and thus shut down the computer systems 54 that are receiving power from those remote power panels 220). The shedding of computer systems may be based, for example, on priority of the various computer systems receiving power from reserve power system 202. In certain embodiments, shunt trips 236 are controlled by overload protect circuit 232 of controller 230.

In some embodiments, each automatic transfer switch is internally controlled. The automatic transfer switch may include fault detection circuitry such that when a fault condition is detected in the primary power input, the automatic transfer switch automatically switches to reserve power. Thus, for the computer systems coupled to the switch, in the event of a failure in any of the elements on primary power side 100 upstream from an automatic transfer switch 222, including floor power distribution unit 112, UPS 110, or switchgear 105, the automatic transfer switch may transfer input power from primary power to reserve power. Following such transfer, the computer systems that have been switched to reserve power may receive power from remote power panel 220 of reserve power system 202. In addition, the computer systems that have been switched to reserve power may be protected against power interruption by UPS 212. In one embodiment, failover from primary power to reserve power is carried out within about 8 to about 20 milliseconds.

In some embodiments, a reserve power system is oversubscribed. As used herein, "oversubscribed" refers to a condition in which total power requirements of the systems coupled to a reserve power system exceed the capacity of the reserve power system (which includes, for example, exceeding the capacity of a sub-system such as a reserve UPS). For example, a reserve power system might have 5 rack systems coupled to it, but only be able to provide reserve power to one of the rack systems at any given time. In some embodiments, a reserve power system may be heavily oversubscribed (for example, subscribed at several times the capacity of the reserve power system). In certain embodiments, oversubscription is applied at a facility-wide level.

In one illustrative embodiment, the total power requirements of computer systems 54 exceed the capacity of reserve power system 200, such that reserve power system 200 is oversubscribed relative to its capacity. For example, the total power requirements of all computer systems 54 in data center may exceed 200 KVA, while the load capacity of reserve power system 200 may be about 20 KVA. Thus, if all of primary power systems 106 failed simultaneously and automatic transfer switches 222 transferred all of computer systems 54 in data center 50 to reserve power system 206, reserve power system 206 would not be able to supply power to all of the computer systems. As is described further herein, a reserve power system may, in some embodiments, include overload protection against overload caused, for example, by switching of loads to the reserve power system in excess of capacity. In one embodiment, a reserve power system may have multiple computer rooms coupled to the reserve power system, but have the capacity to support one the computer systems of only one computer room at any given time.

Figure 2:
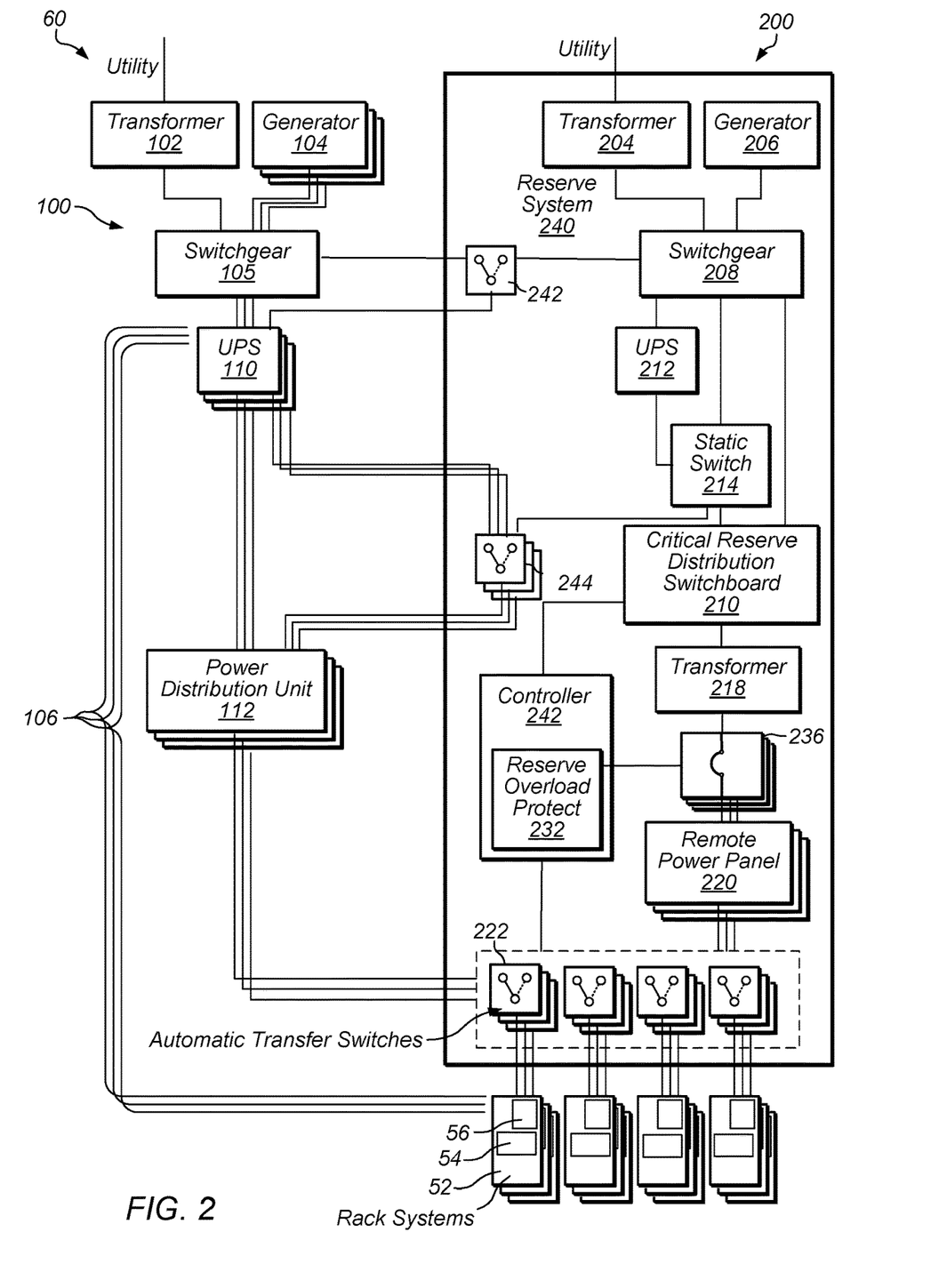
FIG. 2 is a block diagram illustrating an embodiment of a reserve power system that includes automatic transfer switches at a UPS level and a at switchboard level.

In some embodiments, a reserve power system may include automatic transfer between primary power system and a reserve power system at multiple levels in a power chain. For example, a reserve power system may include automatic transfer switches at a UPS level and/or automatic transfer switches at a switchgear level of the power distribution chain. FIG. 2 illustrates an embodiment that includes automatic transfer switches at a UPS level and a switchboard level. Data center 60 includes primary power side 100 and reserve power side 200. Reserve power side 200 includes reserve power system 240. The elements of primary power side 100 and reserve power side 200 may be generally as described above with respect to FIG. 1. Reserve power system 204 shown in FIG. 2, however, includes automatic transfer switches 242 and 244. Automatic transfer switch 242 may automatically switch power between switchgear 105 of primary power side and switchgear 208 of reserve power side 200 (for example, in the event of a failure of switchgear 105). Automatic transfer switch 244 may automatically switch power between one of UPSs 110 of primary power side 100 and UPS 212 of reserve power side 200 (for example, in the event of a failure of one of UPSs 110).

In some embodiments, a reserve power system protects a switchboard that provides power to multiple UPSs. In certain embodiments, a single switchboard may provide power to all of the primary power UPSs in a data center. In certain embodiments, one or more primary power UPSs and one or more reserve power UPSs receive power from the same switchboard. In certain embodiments, a single switchboard may provide power to all of the primary power UPSs and reserve power systems in a data center. In various embodiments, a reserve power system may back up any or all of the UPSs in a data center.

Providing a single reserve transformer and remote power panels, such as is illustrated in FIGS. 1 and 2, may eliminate the need for floor power distribution units in a reserve power system. In addition, the costs associated with a transformer/ remote power panel combination may be less than that of a floor power distribution unit of equivalent load capacity. Nevertheless, in various embodiments, a reserve power system may include floor power distribution units (including, for example, a K-rated transformer) instead of, or in addition to, a stand-alone transformer and remote power panels.

Figure 3:
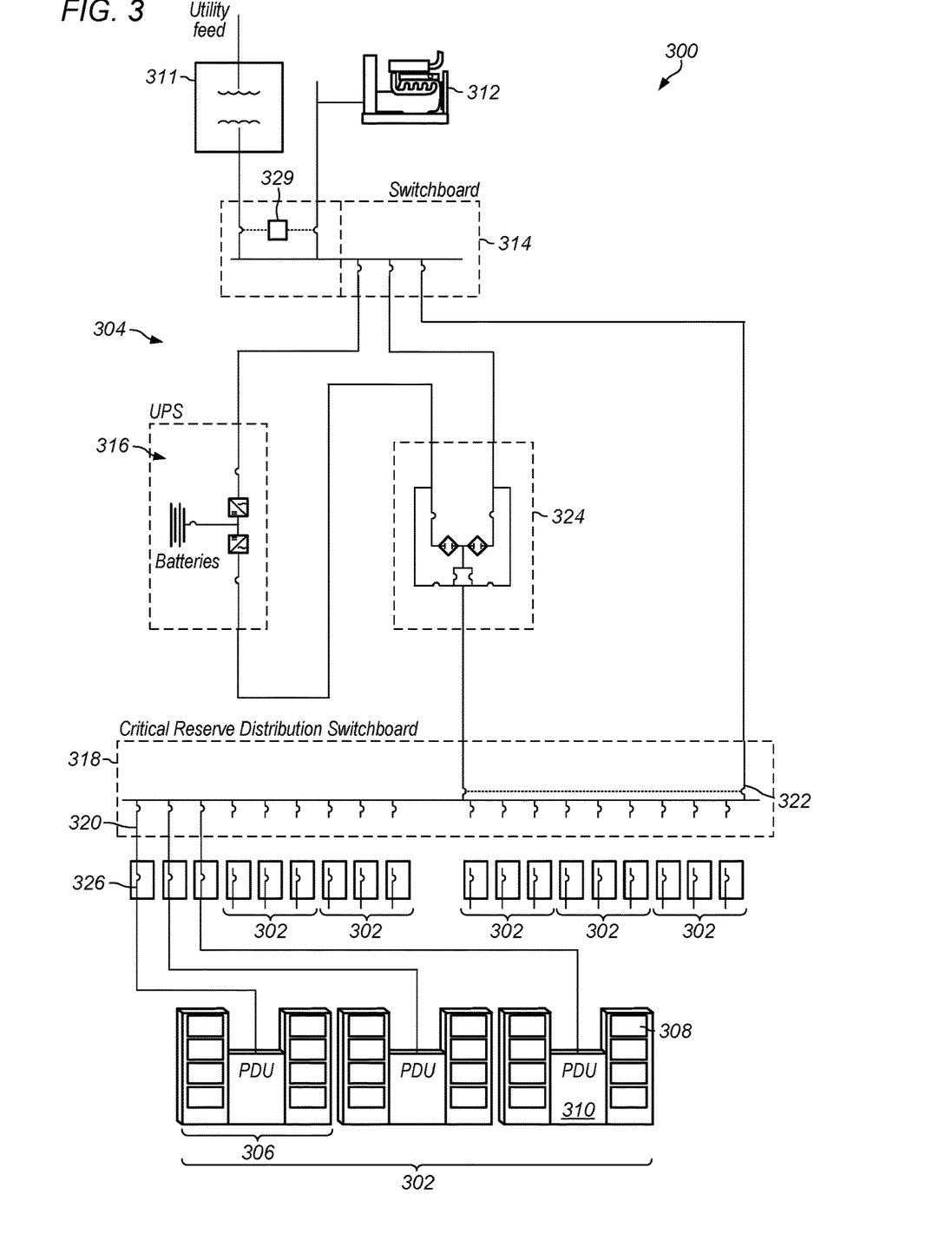
FIG. 3 is a schematic illustrating one embodiment of a reserve power system having power distribution units for rack systems in multiple pods of a data center.

FIG. 3 is a schematic illustrating one embodiment of a reserve power system having power distribution units for rack systems in multiple pods of a data center. Data center 300 includes pods 302 and reserve power system 304. Each of pods 302 may be a separate physical unit that provides computing capacity to data center 300. Each of pods 302 may include rack systems 306 (for clarity, racks systems 306 are shown for only one of pods 302). Rack systems 306 include computer systems 308. The power load for a rack system may be any amount. In various embodiments, the power load for a rack system may be 5 KVA, 10 KVA, or 15 KVA.

Reserve power system 304 includes reserve PDUs 310. Reserve PDUs 310 may provide reserve power to computer systems 308. In one embodiment, each of reserve PDUs 310 is rated for 450 KVA. In some embodiments, rack systems 306 include rack power distribution units that provide power to computer systems 306 in two-phases, 30 amps per phase.

Reserve power system 304 includes transformer 311, generator 312, reserve bypass switchboard 314, UPS 316, and critical reserve distribution switchboard 318. Critical reserve distribution switchboard 310 includes automatic transfer switches 320 and automatic transfer switch 322. In some embodiments, automatic transfer switches 320 provide automatic switching from between reserve power and primary power for one or more of sets of computer systems 306 in racks 304. In one embodiment, automatic transfer switches 320 are rated at 700 amps.

Automatic transfer switch 322 may provide for bypassing UPS 316 (for example, during maintenance of UPS 316). Redundant bus static switch 324 may also allow bypass of UPS 316.

Reserve power system 304 also includes shunt trips 326. Shunt trips 326 may provide overcurrent protection for reserve power system 304, such as described above with respect to FIG. 1. In one embodiment, shunt trips 326 are rated at 700 A.

Transformer 311 may transform power from a utility feed. In one embodiment, transformer has an output of 480Y/277 volts, three-phase power. Reserve bypass switchboard 314 includes automatic transfer switch 329. Automatic transfer switch 329 may provide automatic switching from utility feed to generator 312 (for example, in the event of a failure of utility power. In one embodiment, generator 312 has an output of 480 Y/277 volts three phase power. In certain embodiments, generator 312 is controlled by a PLC.

Although the power output in the example given above is at 480 Y/277 volts, power voltage in primary power systems and reserve power system may in various embodiments be at other voltage levels. Power voltage levels in may vary, for example, based on the location of a data center. For example, power voltage levels may vary from one geographic region to another, or from one country to another. In one embodiment, a voltage level in a power system (for example, at a transformer output) is about 400 volts. In another embodiment, a voltage level (for example, at a transformer output) in a power system is about 600 volts.

Figure 4:
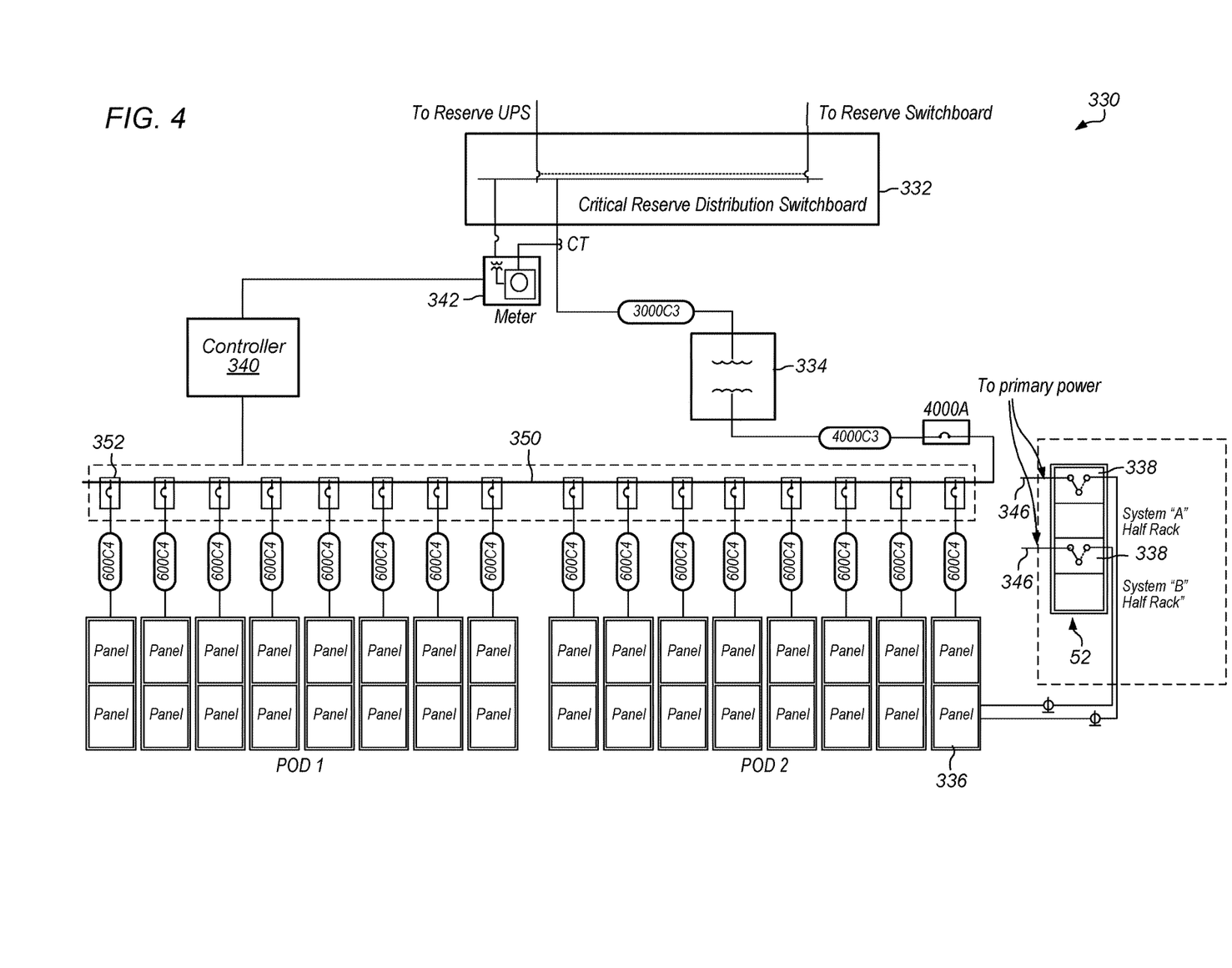
FIG. 4 is a schematic illustrating one embodiment of transformation and distribution sections of a reserve power system.

FIG. 4 is a schematic illustrating one embodiment of transformation and distribution sections of a reserve power system. Reserve power system 330 includes critical reserve distribution switchboard 332, transformer 334, power panels 336, and automatic transfer switches 338. Reserve power from a utility feed (with or without step-down transformation), a generator, or a UPS may be provided to critical reserve distribution switchboard 332. In one embodiment, a reserve power system UPS, step-down transformer, and generator are similar to those described above with respect to FIG. 3. Thus, in one embodiment, critical reserve distribution switchboard 332 transmits power at 480 Y/277 volts, three-phase power, such as from transformer 311 described above with respect to FIG. 1.

In one embodiment, transformer 334 transforms power to be distributed to rack systems 54. Transformer 334 may transform power to a power output of 480/360-208 volts, three-phase power. In some embodiments, transformer 334 is derated. In certain embodiments, transformer 334 derated is based on a K-13 load profile. In one embodiment, transformer 334 is derated to 80%.

Power panels 336 distribute reserve power to computer systems in rack systems 52. Each of power panels 336 may provide power to a different set of computer systems. For example, each power panel may distribute power to one rack or one half-rack (for clarity, only one rack system 52 is shown in FIG. 4). In one embodiment, power panels 336 include main lug only (MLO) conductors. In some embodiments, power panels 336 may include breaker panels. In one embodiment, power panels 336 can distribute up to 600 amps. Although in the embodiment shown in FIG. 4, reserve power system includes 32 power panels in two pods for illustration purposes, a reserve power system may have any number of power panels that provide reserve power to any number racks, in any number of computer rooms, modules, or pods.

Automatic transfer switches 338 may automatically switch power between primary power and reserve power from reserve power system 330. Primary power is transmitted over primary power lines 346. Each of automatic transfer switches 338 may switch power to computer systems in one half rack of rack 52.

In an embodiment, an automatic transfer switch includes a dual input including a primary and secondary input each at 200-240 VAC 24 A, single phase, 50/60 Hz, and an output at 200-240 VAC 24 A, single phase, 50/60 Hz. Autoswitching between the primary input and the secondary input may be based on drop-out of 182 volts, pull-in of 195 volts, based on an input voltage of 208 V.

Power from transformer 334 may be transmitted on power bus 350. Shunt trip breakers 352 are provided for each of rack systems 52 between transformer 334 and power panels 336. In some embodiments, overcurrent protection for reserve power system 330 is controlled with controller 340. Controller 340 may receive data from meter 342 coupled to critical reserve distribution switchboard 332. In one embodiment, if the load at a reserve UPS (such as UPS 316 described above relative to FIG. 3) exceeds a first predetermined level, and reserve power system 330 trips into static bypass, and if the load at the UPS exceeds a second predetermined level, some PDUs are shed by way of shunt trip breakers 352. In one embodiment, in a system including a 750 KW UPS, a reserve power system trips into static bypass if the load at the UPS is over 700 KW, and the lowest priority PDUs are shed if the load at the UPS is more than 90% of the rating of the static bypass.

Figure 5:
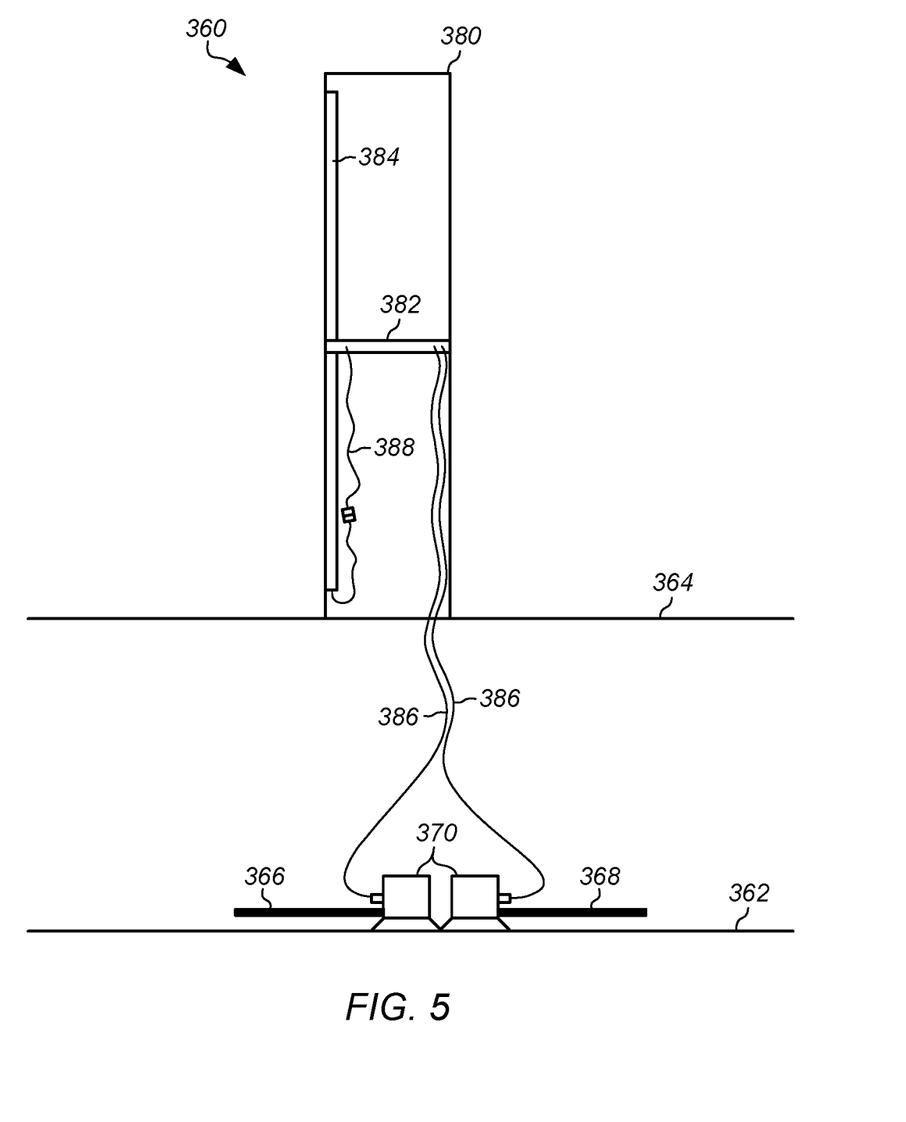
FIG. 5 is a schematic diagram illustrating an arrangement of a rack including an automatic transfer switch in a data center.

FIG. 5 is a schematic diagram illustrating an arrangement of a rack including an automatic transfer switch in a data center. Data center 360 includes floor 362 and raised floor 364. Primary power source conductors 366 and reserve power source conductors 368 are carried on or near floor 362. Primary power source conductors 366 and reserve power source conductors 368 may terminate at power receptacles 370.

Rack 380 includes automatic transfer switch 382 and power strips 384. In some embodiments, automatic transfer switch 382 is housed in a separate enclosure. The separate enclosure for the automatic transfer switch may be rack-mountable. Input cables 386 may plug into power receptacles 370 and carry power from primary power source conductors 366 and reserve power source conductors 368 to automatic transfer switch 382. Output cable 388 may carry power from automatic transfer switch 382 to power strips 384. Computer systems in rack 380 may plug into power strips 384 and receive power through power strips 384.

Figure 6:
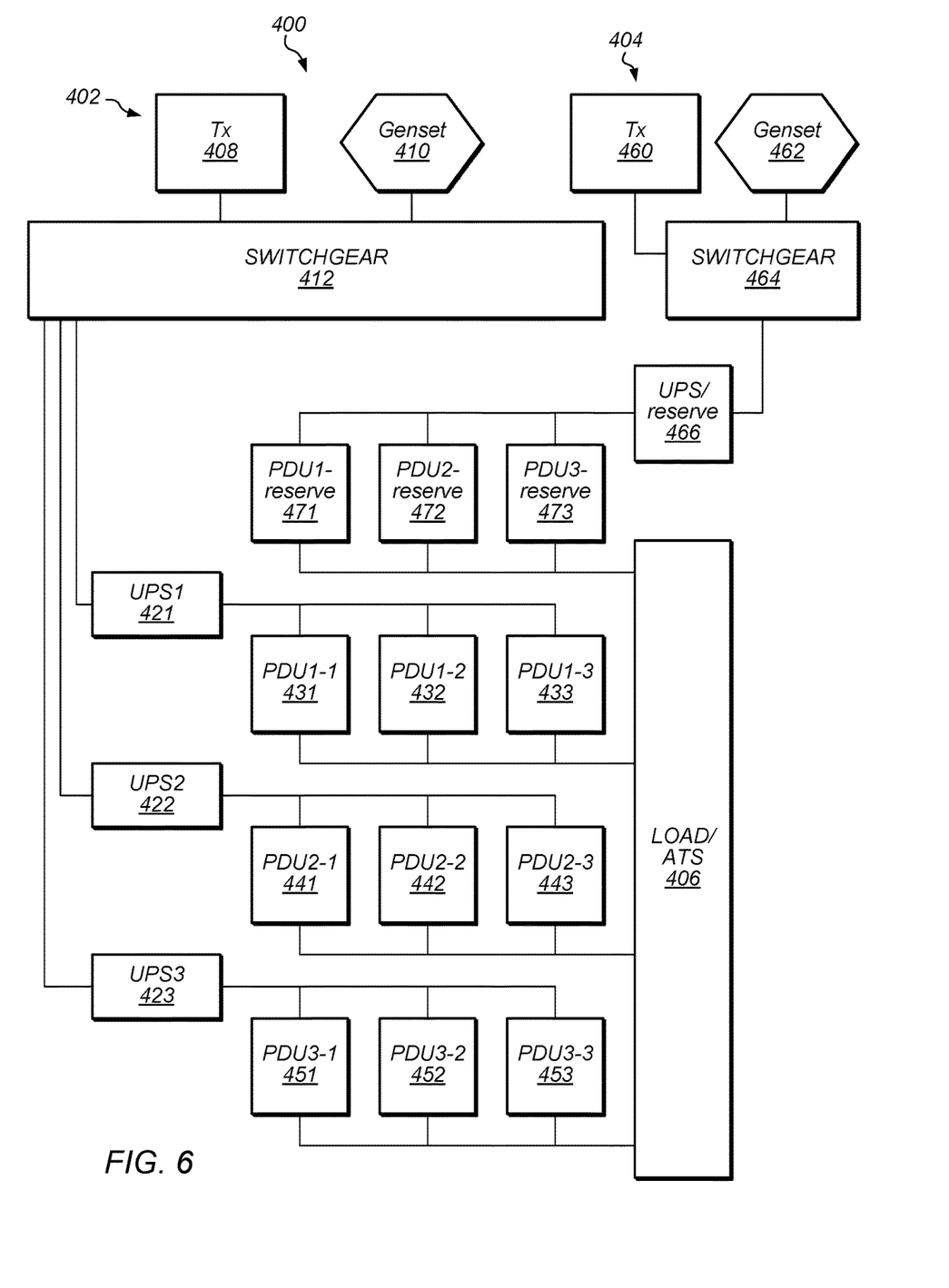
FIG. 6 illustrates a reserve power system with a PDU that provides reserve power for computer systems on multiple primary PDUs.

FIG. 6 illustrates a reserve power system with a PDU that provides reserve power for computer systems on multiple primary PDUs. Data center 400 includes primary power side 402 and reserve power side 404. Primary power side 402 and reserve power side 404 provide power to loads 406. Loads 406 may be, for example, servers in a data center. Automatic transfer switches may switch power between primary and reserve for individual loads 406.

Primary power side 402 includes transformer 408, generator set 410, and switchgear 412. Switchgear 412 may provide power to PDU1-1 431, PDU1-2 432, and PDU1-3 433 through UPS1 421. Switchgear 412 may provide power to PDU2-1 441, PDU2-2 442, and PDU2-3 443 through UPS2 422. Switchgear 412 may provide power to PDU3-1 451, PDU3-2 452, and PDU3-3 453 through UPS3 423.

Reserve power side 404 includes transformer 460, generator set 462, and switchgear 464. Switchgear 464 may provide power to PDU1-reserve 471, PDU2-reserve 472, and PDU3-reserve 473 through UPS-reserve 466. UPS-reserve 466 may back up any or all of the UPSs on primary side 402. PDU1-reserve 471, PDU2-reserve 472, and PDU3-reserve 473 may back up any or all of the PDUs on primary side 402.

In some embodiments, each PDU in a reserve power system may provide reserve power for computer systems on different primary PDUs. For example, PDU1-reserve 471 may provide reserve power for computer systems on PDU1-1 431, PDU1-2 432, and PDU1-3 433; PDU2-reserve 472 may provide reserve power for computer systems on PDU2-1 441, PDU2-2 442, and PDU2-3 443; and so on. Although in the embodiment shown in FIG. 7, each reserve PDU backs up three primary PDUs, a reserve PDU may back up any number of primary PDUs.

The embodiment illustrated in FIG. 6 may not include any static transfer switches on the UPS output. This may eliminate the need for the use of a system control cabinet, and may reduce the "blast radius" of a power system failure. The UPS stacks may behave independent of each other and allow resiliency at a smaller component level (for example, a PDU or 25 rack blast zone). In some embodiments, the blast zone may be further mitigated by the installation of dual automatic transfer switches at the rack level.

Figure 7:
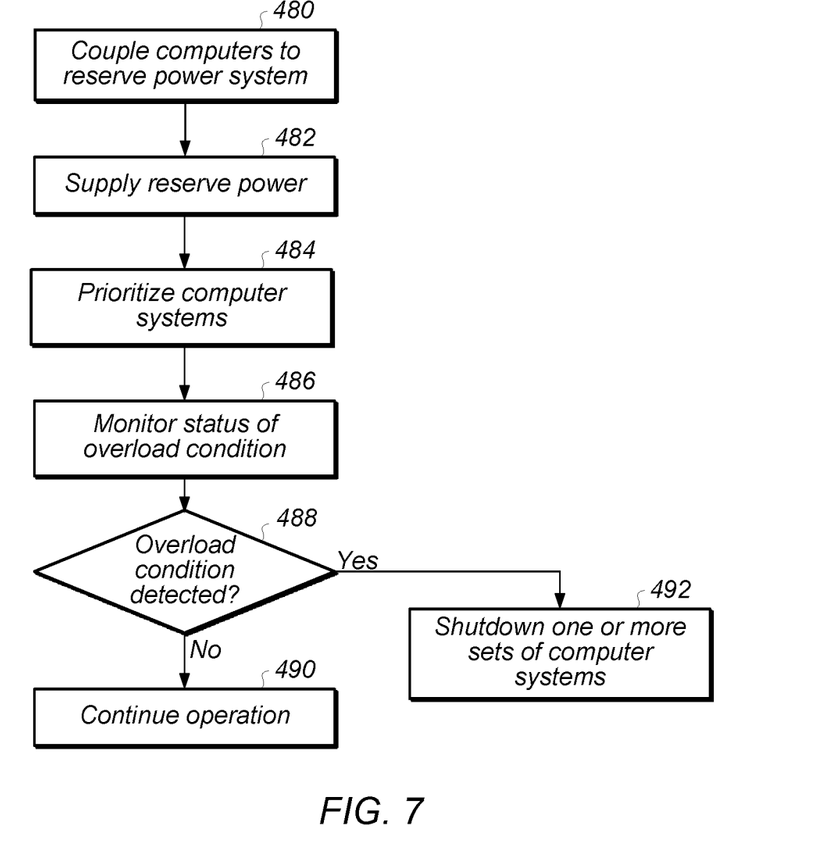
FIG. 7 illustrates providing reserve power for computer systems in a data center.

FIG. 7 illustrates providing reserve power for computer systems in a data center. At 480, a reserve power system is coupled to two or more sets of computer systems. Each set of computer systems may be, for example, the computer systems in a rack system of the data center. The reserve power system may be oversubscribed such that total power requirements of the sets of computer systems exceed the capacity of the reserve power system (including a subsystem or component thereof, such as a reserve UPS). In certain embodiments, the reserve power system may be heavily oversubscribed. For example, in one embodiment, the total load of the computer systems to which the reserve power system is coupled is more than 10 times the capacity of the reserve UPS.

At 482, reserve power is supplied to at least one of the sets of computer systems when at least one condition is met. Power may be switched over automatically, such as by way of the automatic transfer switches described above relative to FIGS. 1-6. The condition may be, for example, an at least partial failure of a primary power system.

At 484, the sets of computer systems are prioritized. At 486, status of at least one condition in the reserve power system is monitored. The condition may be, for example, a predetermined current level in a reserve power system. At 488, if no faults are detected, reserve power system may remain in full operation. If a fault is detected in one or more of the sets of computer systems (such as the lowest priority set of computer systems) may be shut down to protect against overload of the reserve power system at 492.

Figure 8:
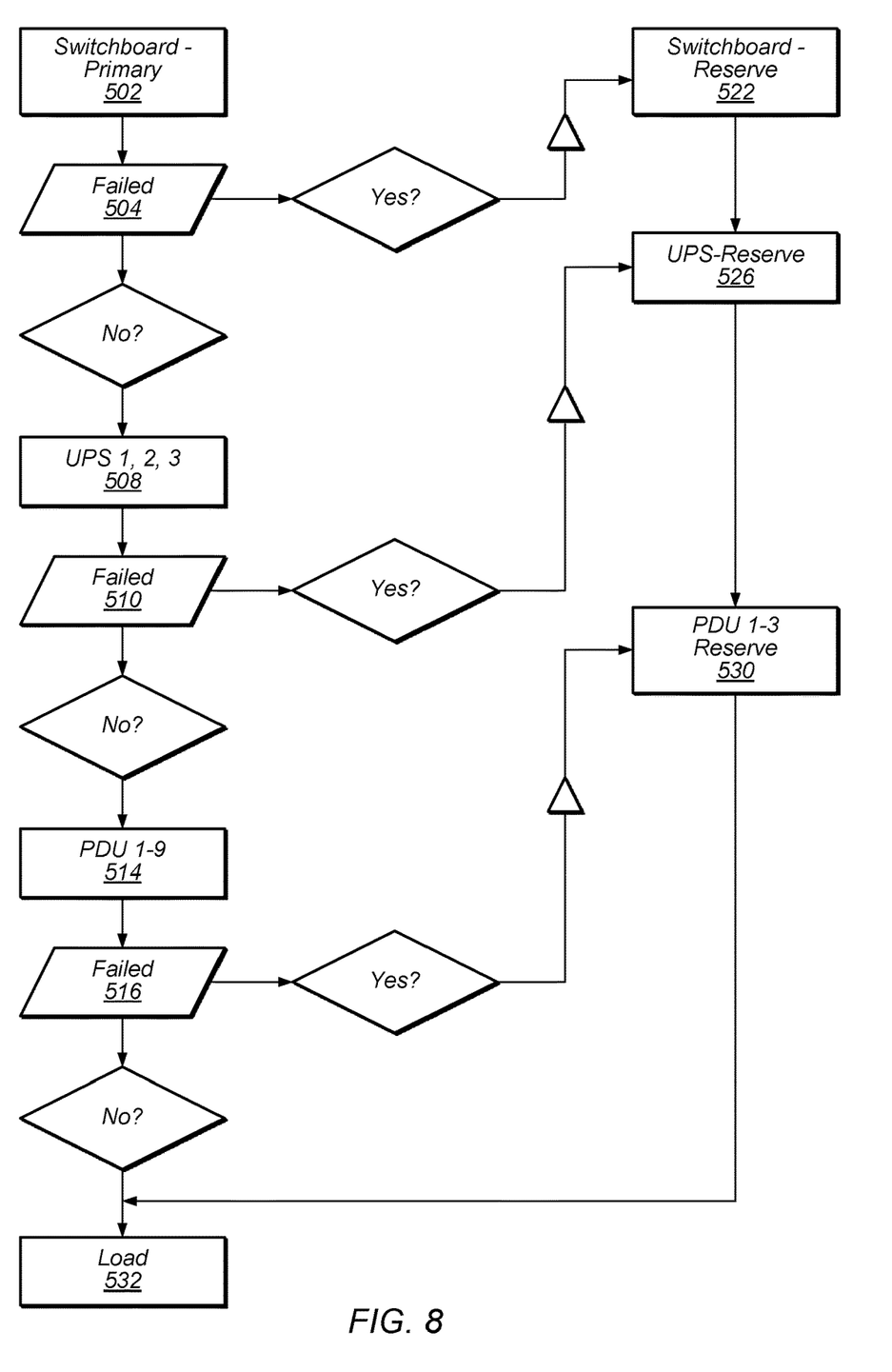
FIG. 8 is a flow diagram illustrating failover logic for a reserve power system.

FIG. 8 is a flow diagram illustrating failover logic for a reserve power system. The failover logic may be implemented, for example, in a programmable logic controller such as described above relative to FIG. 1. At 502, a primary switchboard is powered up. At 504, the primary switchboard may be monitored for a failure condition. If no failure has occurred upon start up of the primary switchboard, primary UPSs 1, 2, 3 may be brought into service at 508 as the primary switchboard continues to operate. At 510, primary UPSs 1, 2, 3 may be monitored for failure conditions. If no failure has occurred upon start up of primary UPSs 1, 2, 3, primary PDUs 1-9 may be brought into service at 514 as the primary switchboard and primary UPSs 1,2, 3 continues to operate. At 516, primary PDUs 1-9 may be monitored for failure conditions at 516. If no failure has occurred upon start up of the primary PDUs 1-9, loads may be brought online at 532. Loads may be, for example, from servers in a data center.

During computing operations, monitoring may continue of the primary switchboard, primary UPSs 1, 2, 3, and PDUs 1-9 at 504, 510, and 516, respectively. If a failure condition is detected in the primary switchboard, the loads may be switched to reserve switchboard at 522. If a failure condition is detected in any or all of primary UPSs 1, 2, 3, the loads may be switched to reserve UPS at 526. If a failure condition is detected in any or all of primary PDUs 1-9, the loads may be switched to one of reserve PDUs 1-3 at 530.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A data center, comprising:
    a first set of computer systems;
    a second set of computer systems;
    a first primary power system coupled to, and configured to supply primary power to, the first set of computer systems via a first set of two or more automatic transfer switches, wherein the first primary power system comprises a connection to a first primary utility power source and a first primary back-up generator, wherein the first primary power system is configured to supply primary power from its first utility power source or its first back-up generator to the first set of computer systems coupled to the first primary power system via the first set of two or more automatic transfer switches;
    a second primary power system coupled to, and configured to supply primary power to, the second set of computer systems via a second set of two or more automatic transfer switches, wherein the second primary power system comprises a connection to a second primary utility power source and a second primary back-up generator, wherein the second primary power system is configured to supply primary power from its second utility power source or its second back-up generator to the second set of computer systems coupled to the second primary power system via the second set of two or more automatic transfer switches;
    a reserve power system coupled to, and configured to automatically supply reserve power to, each of the first and second sets of computer systems via the first or second sets of automatic transfer switches, wherein the reserve power system comprises a connection to a reserve utility power source and a reserve back-up generator, wherein the reserve power system is configured to supply the reserve power from the reserve utility power source or the reserve back-up generator to any given one of the two or more first or second sets of computer systems when primary power is not available to the given one of the first or second sets of computer systems, and wherein total power requirements of sets of computer systems coupled to the reserve power system, including the first and second sets of computer systems, exceed a capacity of the reserve power system to concurrently supply reserve power,
    wherein the reserve power system further comprises:
        a first remote power panel configured to distribute power to the first set of automatic transfer switches coupled to the first set of computer systems;
        a second remote power panel configured to distribute power to the second set of automatic transfer switches coupled to the second set of computer systems; and
        two or more respective overload protection devices, wherein respective ones of the two or more overload protection devices are electrically coupled in the reserve power system upstream of respective ones of the first and second remote power panels and are each configured to shed loads associated with a respective one of the first or second remote power panels in response to total power requirements on the reserve power system exceeding the capacity of the reserve power system to concurrently supply reserve power,
        wherein shedding the loads results in a reduced total power requirement on the reserve power system that is within the capacity of the reserve power system to concurrently supply reserve power;
    wherein the respective automatic transfer switches of the first and second sets are each configured to automatically transfer at least one subset of computer systems of the first or second sets of computer systems from receiving power from its respective first or second primary power system to instead receive power from the reserve power system via the first or second remote power panel of the reserve power system while other ones of the computer systems of the first and second sets of computer systems continue to receive primary power from their respective first or second primary power systems.

2. The data center of claim 1, further comprising:
a first computer room, wherein the first set of computer systems is included in the first computer room;
a second computer room, wherein the second set of computer systems is included in the second computer room;
wherein the first primary power system supplies primary power to the first computer room;
wherein the second primary power system supplies primary power to the second computer room, and
wherein the reserve power system provides reserve power support to multiples computer rooms including the first and second computer rooms.

3. The data center of claim 1,
wherein the first set of computer systems comprises computer systems mounted in a first set of racks;
wherein the second set of computer systems comprises computer systems mounted in a second set of racks'
wherein the first primary power system supplies primary power to the first set of computer systems mounted in the first set of racks,
wherein the second primary power system supplies primary power to the second set of computer systems mounted in the second set of racks; and
wherein the reserve power system provides reserve power support to the first set of computer systems mounted in the first set of racks and the second set of computer systems mounted in the second set of racks.

4. The data center of claim 1, wherein each of the first and second respective primary power systems comprises:
a primary transformer that receives power from one the respective primary utility power sources; and
at least one uninterruptible power supply (UPS) electrically coupled in the respective primary power system downstream of the primary transformer.

5. The data center of claim 1, wherein the overload protection devices comprise shunt trip breakers.

6. The data center of claim 1, wherein the reserve power system comprises:
a controller configured to control shedding of loads via the two or more respective overload protection devices based, at least in part, on a priority of computer systems that are distributed power from respective ones of the sets of remote power panels.

7. The data center of claim 1, further comprising:
eight or more additional sets of computer systems, and
eight or more additional respective primary power systems, such that the reserve power system is oversubscribed by a ratio equal to or exceeding 10:1.

8. A power system, comprising:
a first set of loads;
a second set of loads;
a first primary power systems coupled to, and configured to supply primary power to the first set of loads via a first set of two or more automatic transfer switches, wherein the first primary power system comprises a connection to a first primary utility power source, wherein the first primary power system is configured to supply primary power from the first primary utility power source to the first set of loads coupled to the first primary power system via the first set of two or more automatic transfer switches;
a second primary power system coupled to, and configured to supply primary power to the second set of loads via a second set of two or more automatic transfer switches, wherein the second primary power system comprises a connection to a second primary utility power source, wherein the second primary power system is configured to supply primary power from the second primary utility power source to the second set of loads coupled to the second primary power system via the second set of two or more automatic transfer switches;
a reserve power system coupled to, and configured to automatically supply reserve power to, each of the first and second sets of loads, wherein the reserve power system comprises a connection to a reserve utility power source and a reserve back-up generator, wherein the reserve power system is configured to supply the reserve power from the reserve utility power source or the reserve back-up generator to any given one of the first or second sets of loads when primary power is not available to the given one of the first or second sets of loads, and wherein the total power requirements of loads coupled to the reserve power system, including the first and second sets of loads, exceed the capacity of the reserve power system to concurrently supply reserve power,
wherein the reserve power system further comprises:
a first remote power panels configured to distribute power to the first set of automatic transfer switches coupled to the first set of loads;
a second remote power panel configured to distribute power to the second set of automatic transfer switches coupled to the second set of loads; and
two or more respective overload protection devices, wherein respective ones of the two or more overload protection devices are electrically coupled in the reserve power system upstream of respective ones of the first and second remote power panels and are each configured to shed loads associated with a respective one of the first or second remote power panels in response to total power requirements on the reserve power system exceeding the capacity of the reserve power system to concurrently supply reserve power,
wherein shedding the loads results in a reduced total power requirement on the reserve power system that is within the capacity of the reserve power system to concurrently supply reserve power;
wherein the respective automatic transfer switches of the first and second sets are each configured to automatically transfer at least one subset of loads of the first or second sets of loads from receiving power from its respective first or second primary power system to instead receive power from the reserve power system via one of the first or second remote power panels of the reserve power system while other ones of the loads of the first and second sets of loads continue to receive primary power from their respective first or second primary power systems.

9. The power system of claim 8, wherein the reserve power system further comprises:
a controller configured to control shedding of loads via the two or more respective overload protection devices based, at least in part, on a priority of loads that are distributed power from respective ones of the first and second remote power panels.

10. The power system of claim 8, wherein each of the first and second respective primary power systems comprises:
a primary transformer that receives power from one the respective first or second primary utility power sources; and at least one uninterruptible power supply (UPS) electrically coupled in the respective primary power system downstream of the primary transformer.

11. The power system of claim 10, wherein the reserve power system further comprises:
   a reserve power-side transformer electrically coupled to the reserve power source; and
   at least one reserve power-side UPS electrically coupled in the reserve power system downstream of the reserve power-side transformer.

12. The power system of claim 11, wherein the respective primary transformers are configured to receive electrical power from the respective first or second primary utility power sources at a voltage equal to or greater than 12 kilovolts; and
   wherein the reserve power-side transformer is configured to receive electrical power from the reserve power source at a voltage equal to or greater than 12 kilovolts.

13. The power system of claim 8, wherein the reserve power system is an active reserve power system that is continuously powered while the power system is in operation.

14. A reserve power system for a data center, comprising:
   a connection to a reserve utility power source;
   a reserve back-up generator;
   a first set of automatic transfer switches each configured to automatically transfer at least one sub-set a first set of computer systems of two or more sets of computer systems of the data center from receiving power from a respective first primary power system corresponding to the first set of computer systems to instead receive power from the reserve power system while other ones of the first set of computer systems continue to receive primary power from the first primary power system corresponding to the first set of computer systems;
   a second set of automatic transfer switches each configured to automatically transfer at least one sub-set a second set of computer systems of the two or more sets of computer systems of the data center from receiving power from a respective second primary power system corresponding to the second set of computer systems to instead receive power from the reserve power system while other ones of the second set of computer systems continue to receive primary power from the second primary power system corresponding to the second set of computer systems;
   a first remote power panels configured to distribute reserve power, via the first set of automatic transfer switches, to the first set of computer systems of the data center;
   a second remote power panel configured to distribute reserve power, via the second set of automatic transfer switches, to the second set of computer systems of the data center; and
   two or more respective overload protection devices, wherein respective ones of the two or more overload protection devices are electrically coupled in the reserve power system upstream of respective ones of the first and second remote power panels and are each configured to shed loads associated with a respective one of the first or second sets of remote power panels in response to total power requirements on the reserve power system exceeding the capacity of the reserve power system to concurrently supply reserve power,
   wherein shedding the loads results in a reduced total power requirement on the reserve power system that is within the capacity of the reserve power system to concurrently supply reserve power, and
   wherein the reserve power system is configured to supply reserve power from the reserve utility power source or the reserve back-up generator to any given one of the two or more sets of computer systems of the data center when primary power is not available to the given one of the two or more sets of computer systems, and wherein the total power requirements of the two or more sets of computer systems exceed the capacity of the reserve power system to concurrently supply reserve power.

15. The reserve power system of claim 14, further comprising:
   a controller configured to control shedding of loads from the two or more sets of computer systems via the two or more respective load protection devices based, at least in part, on a priority of the sets of computer systems that are distributed power from respective ones of the first or second remote power panels.

16. The reserve power system of claim 14, wherein the reserve power system is an active reserve power system that is continuously powered while the data center is in operation.

17. The reserve power system of claim 14, wherein the reserve power system is a passive reserve power system that is powered upon a failure of one or more components of the first or second primary power systems.

18. The reserve power system of claim 14, further comprising:
   a reserve power-side transformer electrically coupled to the reserve power source; and
   at least one reserve power-side UPS electrically coupled in the reserve power system downstream of the reserve power-side transformer.

19. The reserve power system of claim 18, wherein the reserve power-side transformer is configured to receive electrical power from the reserve power source at a voltage equal to or greater than 12 kilovolts.

20. The reserve power system of claim 14, wherein the reserve power system is oversubscribed by a ratio equal to or exceeding 10:1.

* * * * *